(12) United States Patent
Kokuryo et al.

(10) Patent No.: US 7,355,517 B2
(45) Date of Patent: Apr. 8, 2008

(54) PANEL

(75) Inventors: Kazuto Kokuryo, Shiga (JP); Shohei Ohara, Tokyo (JP); Yoshimitsu Matsushita, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 201 days.

(21) Appl. No.: 11/366,551

(22) Filed: Mar. 3, 2006

(65) Prior Publication Data
US 2006/0208907 A1   Sep. 21, 2006

(30) Foreign Application Priority Data
Mar. 4, 2005   (JP) ............ P2005-061623

(51) Int. Cl.
*G08B 13/14* (2006.01)
(52) U.S. Cl. .............. 340/572.8; 340/568.1; 340/693.9
(58) Field of Classification Search ........ 340/572.8, 340/572.1, 568.1, 572.7, 10.1, 10.5, 539.1, 340/825.36, 825.49, 10.4, 531, 572.2, 825.72, 340/693.9, 988
See application file for complete search history.

(56) References Cited
U.S. PATENT DOCUMENTS
3,208,070 A   9/1965 Boicey
5,073,451 A *  12/1991 Iida et al. ............... 428/336
5,198,807 A *  3/1993  Troyk et al. ........... 340/10.34
5,504,474 A *  4/1996  Libman et al. ......... 340/573.4
6,215,401 B1 *  4/2001 Brady et al. ........... 340/572.7
6,275,157 B1 *  8/2001 Mays et al. ............ 340/572.5

FOREIGN PATENT DOCUMENTS
| DE | 42 20 654 | 7/1993 |
| DE | 198 48 753 | 4/2000 |
| EP | 1 628 272 | 2/2006 |
| JP | 2004-326573 | 11/2004 |
| WO | WO 00/36261 | 6/2000 |

OTHER PUBLICATIONS
European Search Report dated Jun. 30, 2006.
* cited by examiner

*Primary Examiner*—Benjamin C. Lee
*Assistant Examiner*—Daniel Previl
(74) *Attorney, Agent, or Firm*—Whitham Curtis Christofferson & Cook, P.C.

(57) ABSTRACT

A glass panel has a first sheet glass and a second sheet glass which are disposed so that main surfaces thereof are made to face each other, an interlayer film which joins the first sheet glass and the second sheet glass together and an electronic tag disposed between the first sheet glass and the second sheet glass. A shielding layer which interrupts the transmission of light is formed on the first sheet glass. A side of the electronic tag is colored such that an external color of a location where the electronic tag is disposed is made difficult to be discriminated from the color of the shielding layer when the location is seen through the second sheet glass.

14 Claims, 3 Drawing Sheets

PANEL

BACKGROUND OF THE INVENTION

1. Field of the Invention

The present invention relates to a panel such as a glass panel having a function to transmit an identification signal.

2. Related Art

In recent years, management technologies making use of electronic tags (also referred to as radio frequency identification or RFID tags) have been spreading. Electronic tags are used so that they are affixed to surfaces of products by means of adhesive or pressure sensitive adhesive double coated tapes. It is proposed that electronic tags be attached to a wide range of articles from small items such as parcels to consumer durables such as automobiles and domestic building materials so as to obtain various types of information therefrom via radio communication for use for control the articles.

For example, JP-A-2004-326573 discloses a motor vehicles control system in which electronic tags in each of which individual vehicle identifying information is written are attached to motor vehicles so as to control them by making such individual vehicle identifying information written in the tags.

As in the system disclosed in JP-A-2004-326573, in case where an electronic tag is attached to a target object to be controlled such as a motor vehicle, it is easy to be handle when affixed to a surface of a body of the vehicle. However, the electronic tag can easily be removed from the surface of the body, and hence, there exists a possibility where the affixed electronic tag may be replaced with another electronic tag by a person who has an evil intention. Alternatively, it is considered that the electronic tag is damaged by an external factor.

In order to make the electronic tag invisible, the electronic tag may be sealed in an interior of the body. However, when sealing the electronic tag in the interior of the body, there is caused a risk where radio waves that are to be received by the electronic tag are shut off by metallic parts which make up the body to thereby prevent the reading of identification information written in the electronic tag.

To avoid these problems, the electronic tag may be affixed to a member inside the vehicle, for example, to an upper surface of the dashboard. When the electronic tag is affixed to the member inside the vehicle, however, since the electronic tag becomes visible through the windshield from the outside of the vehicle and direct from an occupant inside the vehicle, there may be caused a risk where the appearance of the vehicle is damaged from an aesthetic point of view.

SUMMARY OF THE INVENTION

The invention was made in view of the problems and an object thereof is to attach the electronic tag to a position of the vehicle where the appearance of the vehicle from the aesthetic point of view and the function of the electronic tag are least damaged.

According to an aspect of the invention, there is provided a panel including:

a plurality of base materials which are disposed so that main surfaces thereof are made to face each other and which transmit light;

an interlayer film which is disposed between the base materials so as to join the base materials to each other;

an electronic tag which is disposed between the base materials; and a shielding layer which is disposed so as to be in contact with one of the base materials to cover and conceal the electronic tag when viewed from a first side of the panel;

wherein an external color of a location where the electronic tag is mounted is cryptic when viewed from a second side of the panel.

Here, by using a cryptic color for the electronic tag or a surrounding thereof, the two colors of the shielding layer and the electronic tag are difficult to be discriminated from each other, in other words, these two colors cannot be easily distinguished from each other. As an example where colors are difficult to be discriminated from each other, colors of the same base are raised. In addition, in this specification, colors of the same base denote colors which are the same or analogous in at least one of shade, lightness and chroma. Note that when used herein, color may be a single color or a graded color. In addition, when color patterns are formed on the shielding layer, the electronic tag or its surrounding may have such color patterns to be cryptic Incidentally, the main surface of the base material means a joining surface of the base material when making up a panel be joining the base materials together.

According to this aspect of the invention, when the location where the electronic tag is disposed is viewed through the base material on which the shielding layer is not disposed, the electronic tag looks as if the tag were integrated with the shielding layer. Due to this, even in the event that the electronic tag is provided on the panel, the appearance of the vehicle is made difficult to be damaged from an aesthetic point of view.

The base material may be made up of, for example, a sheet glass, a resin base material or a ceramic base material. In addition, the base material may be transparent or translucent.

The electronic tag may be disposed so as to be visible through the base material on which the shielding layer is not disposed, so that the color of the electronic tag itself corresponds to the external color. In addition, the panel may further includes a colored film which covers and conceals the electronic tag thereunder when viewed through the base material on which the shielding layer is not disposed, and the color of the coloring film may be reflected as the external color.

The interlayer film may be disposed between one of the plurality of base materials and the coloring film. By adopting this configuration, even in the event that the coloring film is made up of a material which is difficult to be joined to the base material, by holding the interlayer film between the coloring film and the base material, the two base materials and an intermediate layer made up of the electronic tag, the coloring layer and the interlayer film can be bonded together.

The interlayer film may be disposed between the base material on which the shielding layer is not disposed and the electronic tag, so that the color of the location where the interlayer film covers and conceals the electronic tag thereunder may be reflected as the external color. In addition, when viewed through the base material on which the shielding layer is not disposed, the base material on which the shielding material is not disposed may be colored so as to cover and conceal the electronic tag thereunder, so that the color of the location where the base material is colored may be reflected as the external color. Additionally, the shielding layer may have a portion of which the color changes.

The base material may be a sheet glass which has the shape of an automotive windshield. In other words, according to another aspect of the invention, there is provided a window panel adapted to be mounted in a vehicle body, including:

a plurality of base materials provided with sheet glasses which are disposed so that main surface thereof are made to be face each other an interlayer film which is disposed between the base materials so as to join the base materials to each other;

an electronic tag which is disposed between the base materials; and a shielding layer which is disposed so as to be in contact with one of the base materials to cover and conceal the electronic tag when viewed from a first side of the panel;

wherein an external color of a location where the electronic tag is mounted is cryptic when viewed from a second side of the panel.

When the panel is applied to a laminated glass used as an automotive windshield, in the event that vehicle information is recorded in the electronic tag disposed inside of the laminated glass, the vehicle information can be read so that a radio communication is difficult to be interrupted. In addition, since the electronic tag is disposed in the interior of the laminated glass, it is difficult to disguise the vehicle information so recorded by replacing the electronic tag with another tag.

Note that what results from combinations of the constituent elements described in the aspect of the invention falls within the scope of the invention, which is to be patented through this application.

According to the invention, since the electronic tag is disposed between the facing base materials so as to be difficult to be identified, the appearance of the panel from the aesthetic point of view and the function of the electronic tag are made difficult to be damaged.

BRIEF DESCRIPTION OF THE DRAWINGS

FIGS. 2A to 2C are drawings which show external appearances of an electronic tag that is used in the glass panel shown in FIG. 1, in which FIG. 2A is a plan view, FIG. 2B is a front view and FIG. 2C is a side view of the electronic tag.

DETAILED DESCRIPTION OF THE PREFERRED EMBODIMENTS

Figure 1:
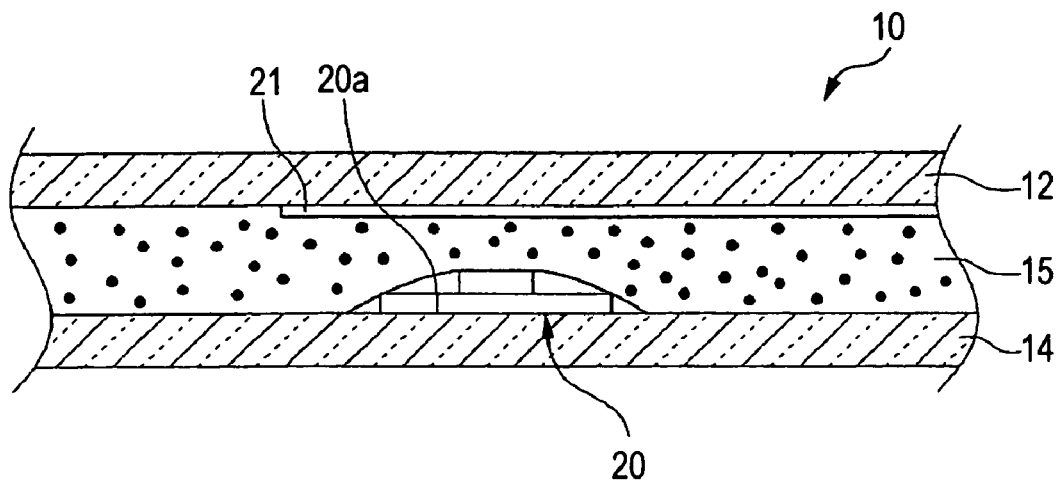
FIG. 1 is a sectional view of a glass panel according to a first embodiment of the invention.

Hereinafter, referring to the drawings, respective embodiments of the invention will be described. Note that in the respective embodiments, like reference numerals are imparted to the same or corresponding constituent elements, so as to omit a duplicate description as appropriately. In addition, in the respective embodiments, a sheet glass is described as being used as the base material.

First Embodiment

In a first embodiment of the invention, a shielding layer is provided on one of two sheet glasses, and an electronic tag is held between the two sheet glasses. The electronic tag is colored so as to look as assuming a color of the same base as the color of the shielding layer, when seen through the other sheet glass on which no shielding layer is disposed. Due to this, the electronic tag looks as if the tag were integrated with the shielding layer, and hence, even in the event that the electronic tag is provided on the glass panel, the appearance of the glass panel is made difficult to be damaged from the aesthetic point of view.

FIG. 1 shows a cross section of a glass panel 10 according to the embodiment of the invention. Note that since the purpose of this drawing is to describe a positional relationship of respective constituent members, a thickness direction is exaggerated, and hence, the drawing is not necessarily such as to represent an actual dimensional relationship of the respective constituent members. The glass panel 10 is a so-called laminated glass in which two sheet glasses are heated and contact bonded under pressure for lamination with an interlayer film held therebetween. Since the laminated glass is such that the two sheet glasses are bonded together with high strength via the interlayer film, the laminated glass is made difficult to be spread in glass fragments when broken. Note that the sheet glass means a glass having a main surface so that an electronic tag can be held by two sheet glasses, and for example, an elongate rod-shaped glass having a rectangular cross section is also contained in the sheet glass.

The glass panel 10 includes a first sheet glass 12, a second sheet glass 14, an interlayer film element 15, an electronic tag 20, and a shielding layer 21. The first and second sheet glasses 12, 14 may be flat plate-shaped glasses or glasses which are formed into a moderately curved shape as of an automotive windshield. Note that a surface of the first sheet glass 12 which faces the interlayer film 15 and a surface of the second sheet glass 14 which faces the interlayer film 15 constitute main surfaces.

The interlayer film 15 is made of a tough resin such as polyvinyl butyral or PVB. The thickness of the interlayer film 15 is such as to be available from interlayer films which are distributed as interlayer films for automotive laminated glasses and is, for example, 0.38 mm or 0.76 mm, and the interlayer film 15 is inserted between the first and second sheet glasses 12, 14 so as to extend to the full extent of the sheet glasses. Functions such as noise insulating function, coloring function and ultraviolet ray cutting function can be imparted to the glass panel 10 by the interlayer film 15. In addition, a plurality of functions can be imparted to the glass panel 10 by superposing a plurality of interlayer films one on the other.

Generally, when an electronic tag is attached to a glass panel, it is considered that the electronic tag is affixed to an external surface of the glass via an adhesive or an adhesive coated tape. When the electronic tag is affixed to the glass panel using the method like this, however, the electronic tag can easily be removed from the glass panel, and furthermore, there is caused a risk where the electronic tag is damaged by a human body or an object when the body or the object is brought into contact with the electronic tag. Due to this, the electronic tag 20 is disposed between the first sheet glass 12 and the second sheet glass 14.

The electronic tag 20 is disposed between the interlayer film 15 and the second sheet glass 14. The electronic tag 20 maybe disposed between the first sheet glass 12 and the interlayer film 15. In addition, a plurality of interlayer films 15 may be provided so that the electronic tag 20 is held between the interlayer films. Joining surfaces of the electronic tag 20 and the first sheet glass 12 or the second sheet glass 14 cannot be bonded together depending on the shape or material of the electronic tag 20. As this occurs, the electronic tag 20 is preferably disposed between the plurality of interlayer films.

A side 20a of the electronic tag 20 which faces the second sheet glass 14 is colored in the same color as the color of the shielding layer 21. Note that the whole surface of the electronic tag 20 may be colored in the same color as the color of the shielding layer 21. In addition, the color of the side 20a of the electronic tag 20 is not necessarily the same as the color of the shielding layer 21. Namely, the color of the side 20a of the electronic tag 20 which results when viewed through the second sheet glass 14 only has to be a color which is difficult to be discriminated from or a color of the same base as the color of the shielding layer 21, when viewed through the interlayer film 15 and the second sheet glass 14. By adopting this configuration, when the electronic tag 20 is seen through the second sheet glass 14, the electronic tag 20 looks as if the tag were integrated with the shielding layer 21. Due to this, even in the event that the electronic tag 20 is disposed in an interior of the glass panel 10, the appearance of the glass panel 10 is not damaged from the aesthetic point of view.

The shielding layer 21 is a thin layer which interrupts the transmission of light and is disposed so as to be in contact with the first sheet glass 12 so as to cover and conceal the electronic tag 20 thereunder from the outside. Consequently, the electronic tag 20 is almost invisible from the outside of the first sheet glass 12. In addition, the shielding layer 21 may be disposed on a surface of the first sheet glass 12 which is opposite to the interlayer film 15.

When the glass panel 10 according to this embodiment of the invention is applied to an automotive windshield, the shielding layer 21 is, for example, a paint layer or print layer which is applied mainly to a circumferential edge portion of the glass panel 10. When the glass panel 10 is used as the automotive windshield, the shielding layer 21 covers and conceals thereunder a portion where an adhesive is coated for adhesion of the glass panel 10 to a windshield frame element of a body of the vehicle. Due to this, the shielding layer 21 not only prevents the deterioration of the adhesive in association with irradiation by light but also enhances the quality of the glass panel 10 in terms of appearance from the aesthetic point of view.

In addition, the shielding layer 21 can be disposed on the surface of the first sheet glass 12 which is opposite to the interlayer film 15 or a surface of the second sheet glass 14 which is opposite to the interlayer film 15, so that the glass panel 10 and the windshield frame element can be bonded together at the portion where the shielding layer 21 is disposed.

The shielding layer 21 is formed, for example, by screen printing a ceramic paste which contains glass frit having a low fusion point on the glass surface. In addition, the shielding layer 21 may be colored in a single color such as black or may have a portion where the color changes. Additionally, in this embodiment, while an area where the shielding layer is provided and an area where the shielding layer 21 is not provided are clearly divided on the main surface of the first sheet glass 12, spots of shielding layer 21 may be provided which gradually reduce in area from the area where the shielding layer 21 is provided towards the area where the shielding layer 21 is not provided. For example, in the event that the electronic tag 20 is covered and concealed by a shielding layer 21 of graded color like the spots of shielding layer 21 which gradually reduce in size, the side 20a of the electronic tag 20 is preferably colored in a graded color.

Figure 2A:
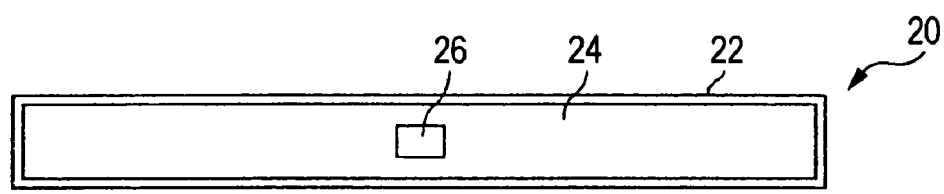
Figure 2B:
Figure 2C:

FIGS. 2A to 2C show external appearances of the electronic tag 20, wherein FIG. 2A is a plan view, FIG. 2B is a front view and FIG. 2C is a side view of the electronic tag 20. The electronic tag 20 includes an insulation film 22 which is formed into a strip-like shape, an antenna 24 formed on a side of the insulation film for transmitting and receiving radio waves such as microwaves and a semiconductor chip 26 which is a radio chip which is connected to the antenna 24 and which transmits predetermined data as a reply to a request made from the outside through radio communication via the antenna 24.

The electronic tag 20 is configured such that data are stored in a memory circuit within the semiconductor chip 26, so that the data so stored can be read out in a non-contact fashion by radio waves such as microwaves or UHF waves. Due to this, in general, the electronic tag 20 can store a large volume of data compared to bar codes or two-dimensional bar codes. In addition, since the electronic tag 20 is different from bar codes or two-dimensional bar bodes in that it is not a printed matter, it is difficult to alter the data stored therein.

The antenna 24 is formed by coating on the resin insulation film 22 a conductive material such as a conductive paste made of mainly copper or silver. The antenna 24 is designed so as to transmit and receive a radio wave of a specific frequency such as a microwave of 2.45 GHz with good efficiency. While one example of the shape of the antenna is a loop, the antenna 24 may be formed into other shapes.

The semiconductor chip 26 is fabricated by, for example, forming a circuit as illustrated in a functional block diagram shown in FIG. 3, which will be described later on, on a single crystal silicone substrate. Since the electronic tag 20 is configured such that the thin antenna 24 is formed on the side of the insulation film 22, the tag becomes thin and flexible. The semiconductor chip 26 is a so-called passive semiconductor chip which is driven using an electromotive force generated by radio waves received from the outside. Since the passive radio chip like this can be made smaller in size than an active one having a power supply incorporated therein by such an extent that the former has no power supply incorporated therein, even in the event that the passive radio chip is provided on an article such as the glass panel 10 in which the external appearance is important, the appearance of the glass panel 10 is not damaged badly from the aesthetic point of view.

The antenna 24 and the semiconductor chip 26 may be sealed in a resin or the like. In addition, a side of the insulation film 22 where the antenna 24 is formed may be covered with a protective resin film to prevent a damage or disconnection of the conductive material due to an external impact.

Figure 3:
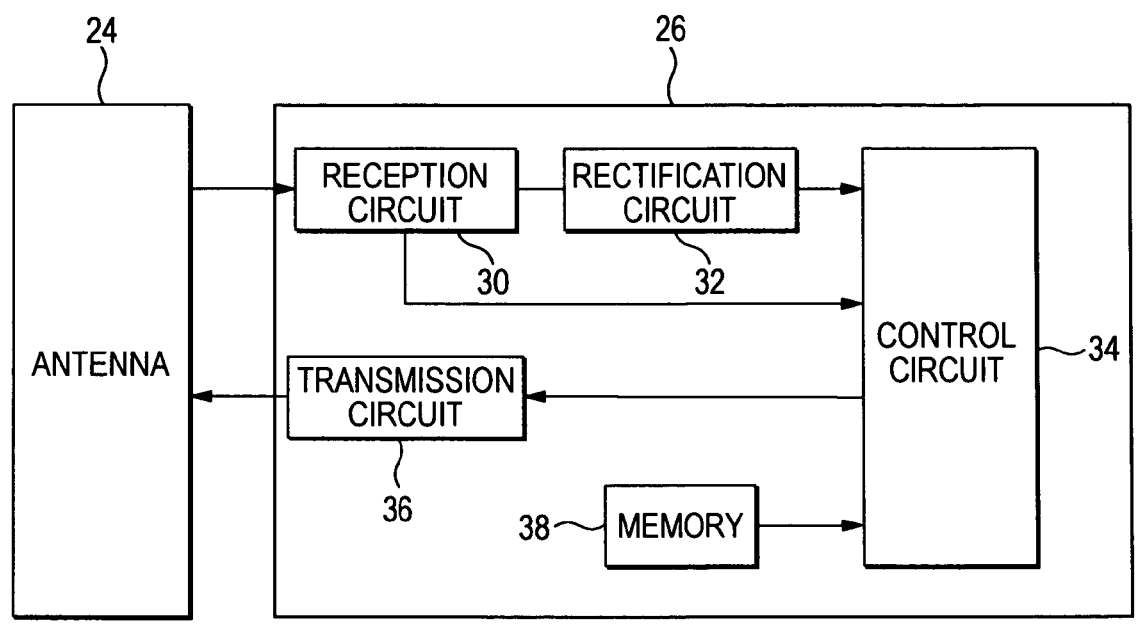
FIG. 3 is a block diagram which shows a functional configuration of a semiconductor chip which makes up the electronic tag that is used in the glass panel shown in FIG. 1.

FIG. 3 is a block diagram which illustrates the functional configuration of the semiconductor chip 26. The semiconductor chip 26 includes a reception circuit 30, a rectification circuit 32, a control circuit 34, a transmission circuit 36 and a nonvolatile memory 38. The reception circuit 30 outputs a radio wave received by the antenna 24 to the rectification circuit 32 and generates a clock signal from the radio wave received by the antenna 24 for output to the control circuit 34. The rectification circuit 32 rectifies the radio wave transmitted from the reception circuit 30 and converts the radio wave so rectified into electric power which constitutes a drive source for the control circuit 34, outputting the electric power so converted to the control circuit 34.

When the clock signal is inputted thereinto from the reception circuit 30, the control circuit 34 fetches predetermined data from the memory 38 and outputs a information signal corresponding to the data so fetched together with a transmission signal to the transmission circuit 36. The transmission circuit 36 modulates the transmission signal inputted from the control circuit 34 with the information signal and transmits the signal so modulated to the outside via the antenna 24. The signal so transmitted is received by read equipment (not shown) placed at an external side.

At least a specific identification number is written in the memory 38, and in addition to the number, various types of data can be stored in the memory 38. The identification number can be used to control the glass panel 10 in which the electronic tag 20 is provided through radio transmission of the number. As examples of data that are stored in the memory 38, there are raised production-related attributes such as production number, production period, production site, production process and distribution history of the glass panel 10, as well as production-related attributes such as constituents or function of the glass. However, the data to be stored in the memory 38 are not limited thereto.

In the semiconductor chip 26, various kinds of frequencies which are used in general can be used, and radio waves can be used whose frequencies include, for example, 135 kHz, 13.56 MHz, 433 MHz, 869 MHz, 915 MHz or 2.45 GHz. These radio waves has their own characteristics. Consequently, the electronic tag 20 is preferably used to match the characteristics of radio waves that are provided by the respective frequencies. For example, since a radio wave of 869 MHz enables a long distance communication, the radio wave is convenient when used so that the electronic tag 20 is distant from the read equipment. In addition, since the electronic tag 20 can be made smaller in size when designed to use a radio wave of 2.45 GHz, the radio wave of that frequency is convenient when attempting to make the electronic tag 20 provided on the glass surface less noticeable.

While, in this embodiment, the semiconductor chip 26 is a read-only chip, a semiconductor chip such as an EEPROM which can both read and write. In the event of a semiconductor chip which can both read and write, in case it is designed that data can be added to the memory at each stage of a flow of distribution, the control of distribution history can be facilitated further.

While, in this embodiment, the passive electronic tag is used as the electronic tag 20, in place thereof, an active electronic tag may be used in which a solar panel is affixed to the surface of the sheet of plate and a semiconductor chip is connected to a power supply such as the solar panel so affixed. In addition, in place of the radio tag, for example, a wired tag may be used in which a conductor wire connected to the electronic tag 20 is led to the outside of the glass panel 10 while passing between the second sheet glass 14 and the interlayer film 15 for further connection to reading equipment.

The glass panel 10 will be fabricated as below. Firstly, the first sheet glass 12, the interlayer film 15, the electronic tag 20 and the second sheet glass 14 are made to overlay in that order. The colored electronic tag 20 can be obtained, for example, by painting the electronic tag 20, covering the electronic tag 20 with a coloring coating or film, or assembling colored constituent parts of the electronic tag 20.

Next, the first and second sheet glasses 12, 14 are heated while compressed such that the interlayer film 15 and the electronic tag 20 are held therebetween and are then depressurized so as to remove a void defined between the facing first and second sheet glasses 12, 14, so that the first sheet glass 12 and the interlayer film 15, and the second sheet glass 14 and the interlayer film 15 are joined to each other, respectively, whereby the glass panel 10, which is a single laminated glass as shown in FIG. 1, is molded.

A gap that is produced on a joining surface between the electronic tag 20 and the interlayer film 15 is preferably reduced as small as possible. This is because in the event that there exists a gap, the electronic tag 20 is easily dislocated when the glass panel deforms 10.

In addition, a total thickness of the interlayer film 15 and the electronic tag 20 at the portion where the electronic tag 20 is held is preferably equal to the thicknesses of the interlayer film 15 at the other portions. Consequently, a thickness or a material for the interlayer film 15 is preferably selected in consideration of the thickness of the electronic tag 20 and an amount of deformation of the interlayer film when the electronic tag 20 is held.

Second Embodiment

In a second embodiment of the invention, a shielding layer is provided on one of two sheet glasses, and an electronic tag is held between the two sheets of the glass. A coloring film is provided which covers and conceals the electronic tag thereunder when the electronic tag is seen through the other sheet glass on which no shielding layer is provided, and the coloring layer, and the coloring layer is colored so as to be a color of the same base as the color of the shielding layer. Due to this, the coloring film that covers and conceals the electronic tag thereunder looks as if it were integrated with the shielding layer, and hence, even in case the electronic tag is provided in the glass panel, the appearance of the glass panel is difficult to be damaged from the aesthetic point of view.

Figure 4:
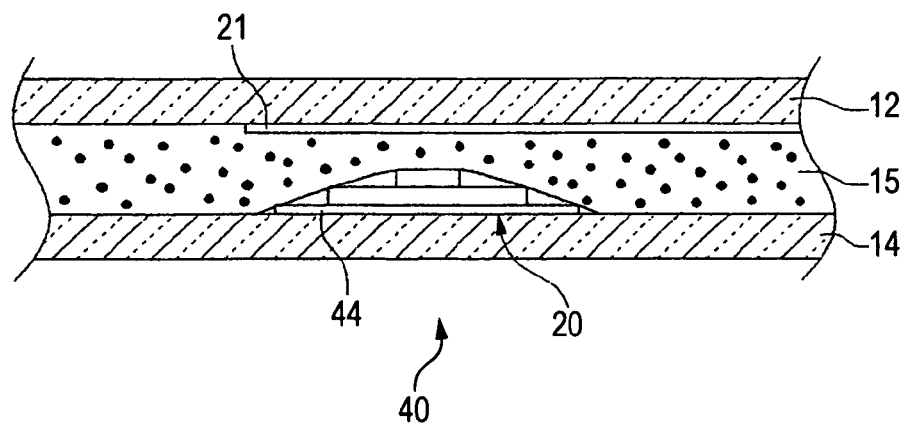
FIG. 4 is a sectional view of a glass panel according to a second embodiment of the invention.

FIG. 4 shows a cross section of a glass panel 40 according to the second embodiment of the invention. The glass panel 40 includes a first sheet glass 12, a second sheet glass 14, an interlayer film 15, an electronic tag 20, a shielding layer 21 and a coloring film 44.

The coloring film 44 is made of, for example, a resin and is disposed between the electronic tag 20 and the second sheet glass 14. The coloring film 44 can constitute a coloring coating which covers the electronic tag 20. In addition, in FIG. 4, another interlayer film may be provided further between the coloring film 44 and the second sheet glass 14.

According to the configuration in which another interlayer film is provided between the coloring film 44 and the second sheet glass 14, even in the event that the coloring film 44 is made of a material which is difficult to be joined to the second sheet glass 14, the first and second sheet glasses 12, 14 and an intermediate layer which is made up of the electronic tag 20, the coloring film 44, the interlayer film 15 and the like can be bonded together.

In addition, the coloring film 44 can be formed of the same material as that of the interlayer film 15. In the event that the coloring film 44 is formed of the same material as that of the interlayer film 15, when fabricating a laminated glass through heating and contact bonding, the first sheet glass 12 and the interlayer film 15, the interlayer film 15 and the coloring film 44, and the coloring film 44 and the second sheet glass 14 can be bonded together, respectively. Due to this, the movement of the electronic tag 20 within the glass panel 40 can be suppressed.

The coloring film 44 is designed such that an external color of the coloring film 44 resulting when viewed through the second sheet glass 14 assumes a color of the same base as the color of the shielding layer 21. Due to this, when a location where the electronic tag 20 is disposed is seen through the second sheet glass 14, the location looks as if it were integrated with the shielding layer 21. Consequently, even in case the electronic tag 20 is provided in the glass panel 40, the appearance of the glass panel 40 is made difficult to be damaged from the aesthetic point of view.

Third Embodiment

In a third embodiment of the invention, a shielding layer is provided on one of two sheet glasses, and an electronic tag is held between the two sheet glasses. The other sheet glass on which no shielding layer is disposed is colored so as to cover and conceal the electronic tag thereunder when the electronic tag is seen through the other sheet glass. Due to this, a colored portion which covers and conceals the electronic tag thereunder looks as if the portion is integrated with the shielding layer, and hence, even in the event that the electronic tag is provided in the glass panel, the appearance of the glass panel is made difficult to be damaged from the aesthetic point of view.

Figure 5:
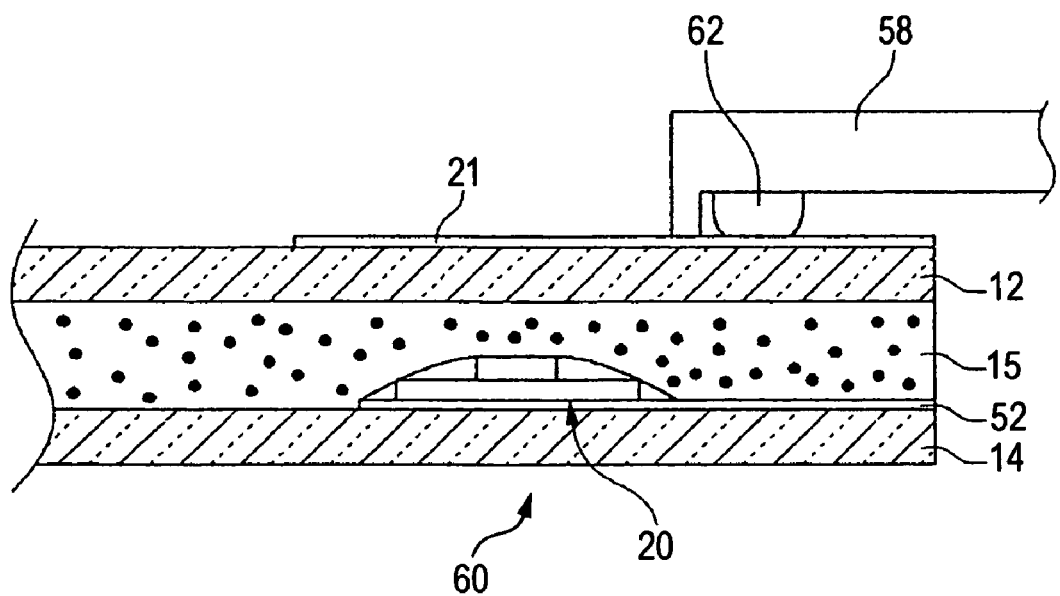
FIG. 5 is a sectional view of a glass panel according to a third embodiment of the invention.

FIG. 5 shows a sectional view of a glass panel 60 according to the third embodiment of the invention. The glass panel 60 includes a first sheet glass 12, a second sheet glass 14, an interlayer film 15, an electronic tag 20, a shielding layer 21 and a coloring layer 52.

The shielding layer 21 is disposed on a surface of the first sheet glass 12 which is opposite to or lies far away from the interlayer film 15. The glass panel 60 is bonded to a glass frame element 58 via an adhesive 62. As this occurs, the adhesive 62 may be in contact with a portion of the glass panel 60 where the shielding layer is provided.

The coloring layer 52 is formed, for example, by coating a resin material containing a pigment on a surface of the second sheet glass 14 which lies on the interlayer film 15 side or a main surface of the second sheet glass 14. The distortion of the interlayer film 15, which may occur when the glass panel 60 is formed, can be suppressed by making the coloring layer 52 thin. In addition, when viewed through the second sheet glass 14, the coloring layer 52 enhances the quality of the glass panel 60 in terms of appearance from the aesthetic point of view. Note that the coloring layer 52 may be formed on a surface of the second sheet glass 14 which is opposite to or lies far away from the interlayer film 15. In addition, the coloring layer 52 may be provided only at a location where the electronic tag 20 is disposed.

The coloring layer 52 is configure such that an external color thereof which results when seen through the second sheet glass 14 assumes a color of the same base as the color of the shielding layer 21. Due to this, when the location where the electronic tag 20 is disposed is seen through the second sheet glass 14, the location looks as if it were integrated with the shielding layer 21. Consequently, even in the event that the electronic tag 20 is provided in the glass panel 60, the appearance of the glass panel 60 is made difficult to be damaged from the aesthetic point of view.

The glass panels 10, 40, 60 of the respective embodiments of the invention can be applied to an automotive windshield, backlight or side glass. When they are applied to an automotive windshield, the same glass can be selected quickly for replacement when the windshield is broken by recording in the electronic tag 20 data such as production number, production period and production site of the windshield, or constituents and function of the glass.

In addition, in the event that data such as the registration number or owner of the vehicle is recorded in the electronic tag 20, when the vehicle is stolen, the vehicle can easily be identified as the stolen one when it is located. In this event, since the electronic tag 20 is disposed in the portion which makes difficult the removal thereof, disguising the vehicle by replacing the electronic tag 20 will be difficult. Furthermore, disguising the vehicle by replacing the whole windshield will also be difficult since lots of labor hours are necessary for replacement of the windshield.

Thus, while the invention has been described heretofore based on the respective embodiments thereof, the invention is such as not to be limited thereto and hence can be modified variously in design or the like based on knowledge of those skilled in the art, and embodiments resulting from those modifications can also be included in the scope of the invention.

For example, the base material may be a resin base material made of polycarbonate or the like or a ceramic base material made of quartz or the like, in addition to the sheet glass. Furthermore, the panel may be a combination of a sheet glass and a resin base material, a combination of a sheet glass and a ceramic base material or a combination of a resin base material and a ceramic base material. Note that when the base material is made of polycarbonate, ethylene vinyl acetate copolymer or EVA is generally used as the interlayer film.

Additionally, the base material may be made up of a translucent material like a frosted glass, in addition to the transparent one. Note that in place of the base material having the light transmission properties, an opaque member which does not transmit light may be adopted as the base material. In addition, the glass panel may be configured such that the electronic tag 20 is disposed between the shielding layer 21 and the interlayer film 15 and the color of at least a location on the interlayer film 15 which covers and conceals the electronic tag 20 thereunder becomes a color of the same base as the color of the shielding layer 21.

In addition, in the respective embodiments, the electronic tag 20 is described as having the construction in which the semiconductor chip is placed on the insulation film. In the electronic tag 20 configured in such a way, as shown in FIG. 1, 4 or 5, a gap still remains on the periphery of the electronic tag 20 even after the sheet glasses and the interlayer film have been joined together. The existence of the gap produces a state in which the electronic tag 20 is easily dislocated and leads to a possibility where the electronic tag 20 is nearly brought into point contact with the sheet glasses at end portions thereof when the glass panel deforms. In case the possibility comes true, a local stress is exerted on the sheet glasses.

Figure 6:
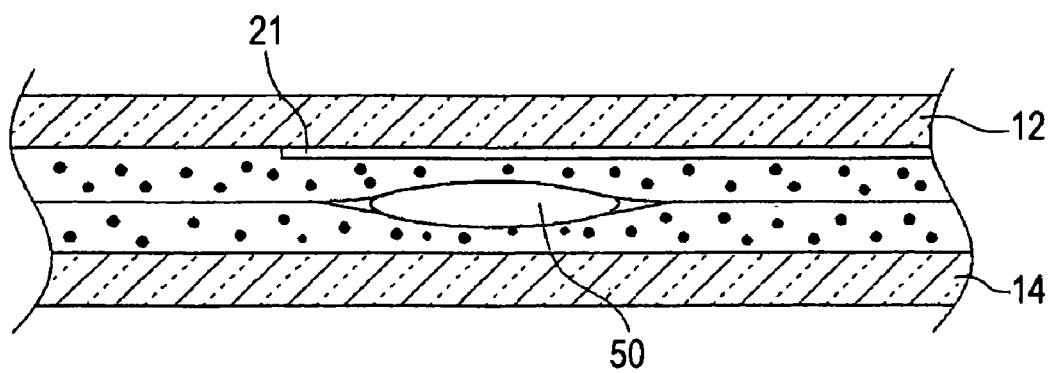
FIG. 6 is a sectional view of a glass panel according to another embodiment of the invention.

Then, as shown in FIG. 6, the electronic tag 20 is encapsulated in a resin having a color of the same base as the color of the shielding layer 21 so as to mold an electronic tag sealing element 50 having a convex lens-like external shape, and the electronic tag sealing element 50 so molded may be held between two interlayer films. By adopting this configuration, since a gap defined between the electronic tag sealing element 50 and the two interlayer films can be reduced, the electronic tag sealing element 50 comes to be easily held at a fixed position.

In addition, the electronic tag sealing element may be formed into other shapes, provided that the shapes are such that a sectional area resulting when the electronic tag sealing element held by facing sheet glasses is cut perpendicularly relative to the glass surface gradually reduces from a central portion towards both ends thereof. Additionally, the size and thickness of the electronic tag 20 can be selected appropriately depending on an interval at which the facing sheet glasses are disposed. As an example, when an interval between the sheet glasses is relatively wide, an electronic tag 20 can be used which is configured so as to be sealed in a cylindrical capsule or the like.

What is claimed is:

1. A panel comprising:
    a plurality of base materials which are disposed so that main surfaces thereof are made to face each other and which transmit light;
    an interlayer film which is disposed between the base materials so as to join the base materials to each other;
    an electronic tag which is disposed between the base materials; and
    a shielding layer which is disposed so as to be in contact with one of the base materials to cover and conceal the electronic tag when viewed from a first side of the panel;
    wherein an external color of a location where the electronic tag is mounted is cryptic when viewed from a second side of the panel.

2. A panel according to claim 1, wherein the electronic tag is disposed to be visible when viewed from the second side of the panel, so that the color of the electronic tag itself corresponds to the external color.

3. A panel according to claim 1, further comprising a coloring film which covers and conceals the electronic tag thereunder when viewed from said another side of the panel,
    wherein the color of the coloring film corresponds to the external color.

4. A panel according to claim 3, wherein the interlayer film is disposed between one of the base materials and the coloring film.

5. A panel according to claim 1, wherein the interlayer film is disposed between the base material on which the shielding layer is not disposed and the electronic tag, so that the color of a location where the interlayer film covers and conceals the electronic tag thereunder corresponds to the external color.

6. A panel according to claim 1, wherein when viewed from the second side of the panel, the base material on which the shielding material is not disposed is colored to thereby cover and conceal the electronic tag thereunder, so that the color of a location where the base material is colored corresponds to the external color.

7. A panel according to claim 1, wherein the shielding layer has a portion of which the color changes.

8. A window panel adapted to be mounted in a vehicle body, comprising:
    a plurality of base materials provided with sheet glasses which are disposed so that main surface thereof are made to be face each other
    an interlayer film which is disposed between the base materials so as to join the base materials to each other;
    an electronic tag which is disposed between the base materials; and
    a shielding layer which is disposed so as to be in contact with one of the base materials to cover and conceal the electronic tag when viewed from a first side of the panel;
    wherein an external color of a location where the electronic tag is mounted is cryptic when viewed from a second side of the panel.

9. A window panel according to claim 8, wherein the electronic tag is disposed to be visible when viewed from the second side of the panel, so that the color of the electronic tag itself corresponds to the external color.

10. A window panel according to claim 8, further comprising a coloring film which covers and conceals the electronic tag thereunder when viewed from said another side of the panel,
    wherein the color of the coloring film corresponds to the external color.

11. A window panel according to claim 10, wherein the interlayer film is disposed between one of the base materials and the coloring film.

12. A window panel according to claim 8, wherein the interlayer film is disposed between the base material on which the shielding layer is not disposed and the electronic tag, so that the color of a location where the interlayer film covers and conceals the electronic tag thereunder corresponds to the external color.

13. A window panel according to claim 8, wherein when viewed from the second side of the panel, the base material on which the shielding material is not disposed is colored to thereby cover and conceal the electronic tag thereunder, so that the color of a location where the base material is colored corresponds to the external color.

14. A window panel according to claim 8, wherein the shielding layer has a portion of which the color changes.

* * * * *